United States Patent Office 2,793,302
Patented May 21, 1957

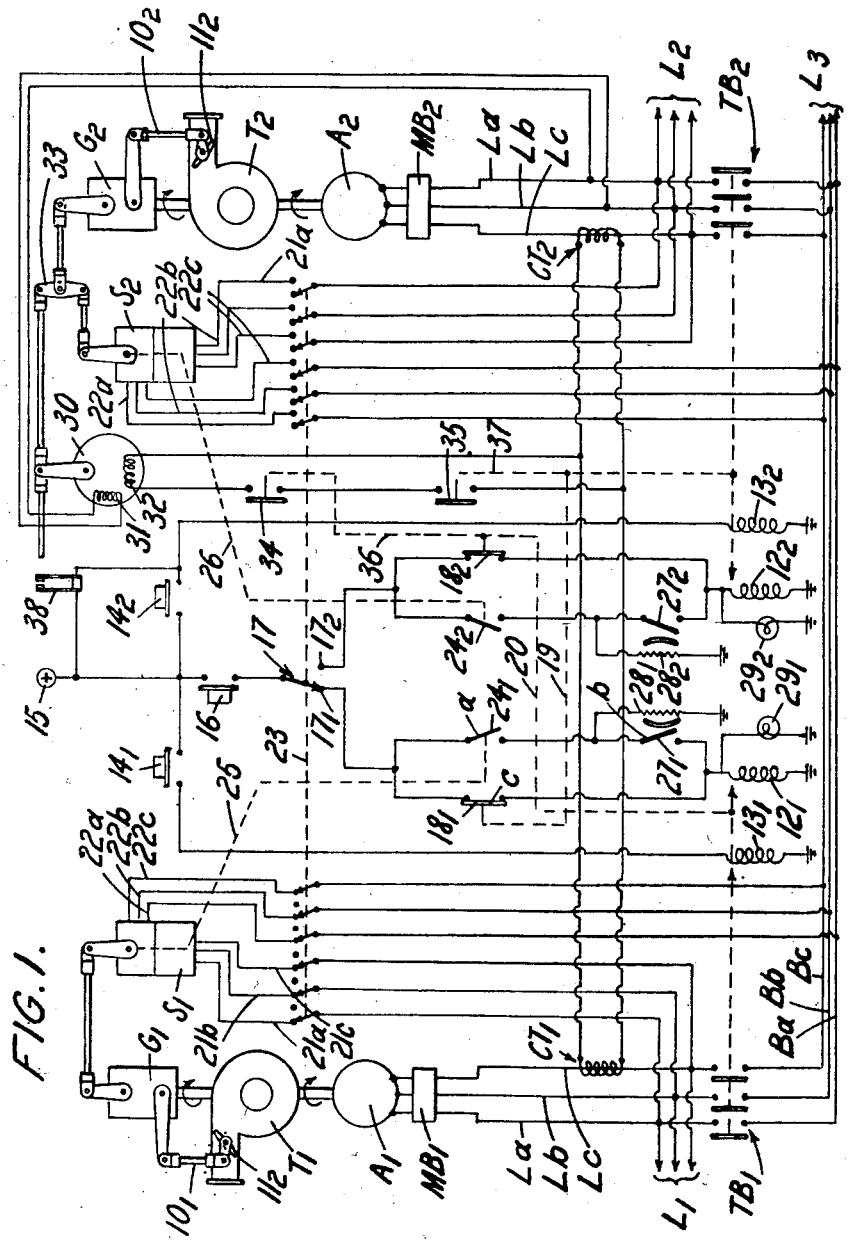

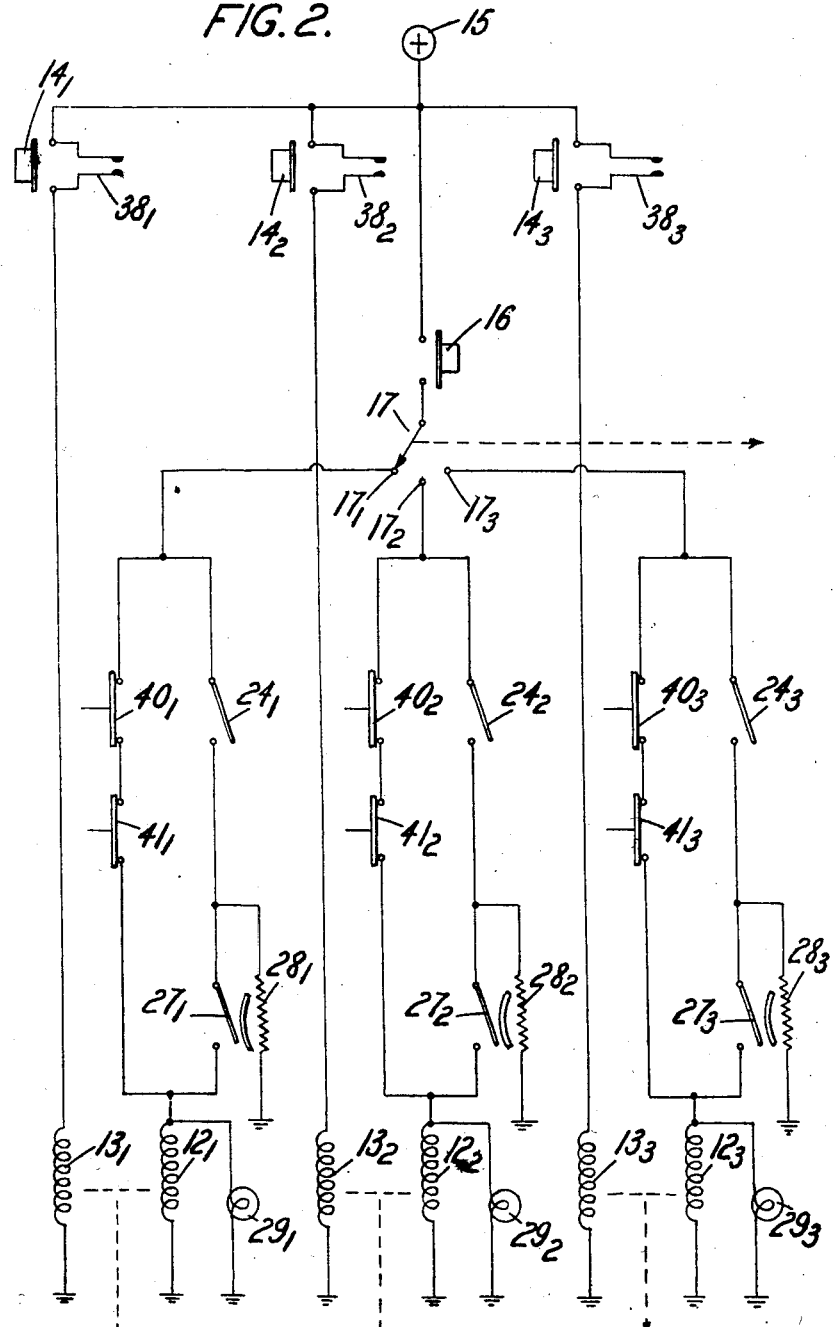

2,793,302

POLYPHASE ALTERNATING CURRENT SYSTEM

John Alfred Chilman, Alfred George Mapp, and John Cripps, Gloucester, England, assignors to Rotol Limited, Gloucester, England, a British company Application October 10, 1955, Serial No. 539,582

Claims priority, application Great Britain October 13, 1954

9 Claims. (Cl. 307—57)

This invention relates to polyphase alternating current systems of the kind (hereinafter referred to as of the kind described) including at least two alternators driven by separate prime movers and each connectible to the bus bars of a load network by a separate power-actuated tie breaker switch. It is to be understood that each or some of the alternators may carry an individual load when not connected to the bus bars, and that additional loads may or may not be connected directly to the bus bars.

In systems of the kind described, particularly when intended for installation in aircraft, it is desirable to provide control means permitting the alternators, or any desired number of them, to be started up and connected to the bus bars of the load network in any order, or permitting one or more of the alternators to be disconnected from the network to carry an individual load.

The object of the present invention is to provide a simple and effective control system for this purpose, well adapted for installation in an aircraft.

The present invention consists in a polyphase alternating current system of the kind described wherein control means for the tie-breaker switches is provided comprising, for each tie-breaker switch, a closing circuit including a first pair of contacts operable by means sensitive to phase displacements between the load network bus bars and the alternator associated with the tie-breaker switch so as to close said contacts at times of phase agreement within the pull-in range, a second pair of contacts closable by a time-delay mechanism which is energised upon the closing of said first pair of contacts, said second pair of contacts being closed by said time delay mechanism after it has been energised for a predetermined time and for each other alternator, a further pair of contacts operable in common with the tie-breaker switch of the alternator so as to be closed when the tie-breaker switch is open and vice-versa, said further pair or pairs of contacts, when they are all closed, together short circuiting said first and second pairs of contacts, the control means also including a selective manually operable switch system permitting the closing circuits of all the tie-breaker switches to be energised from a power source one at a time and in any order.

According to a feature of the present invention said selective manually operable switch system may comprise a manually operable switch which is common to all the tie-breaker switch closing circuits, and a manually operable selector switch having contacts for connecting said manually operable switch into the closing circuit of any one of the tie-breaker switches at a time.

According to another feature of the present invention each prime mover driving an alternator may be provided with a speed-controlling device of the kind responsive to the difference between the frequencies of energisation currents supplied to two polyphase windings of an actuator forming part of the device, in which case the control means includes a manually operable selector switch adjustable into a number of settings equal to the number of alternators, each setting serving to connect one of said polyphase windings of one of said speed-controlling devices to the bus bars of the load network and the other of said polyphase windings to the alternator associated with said one of said speed-controlling devices.

According to another feature of the present invention each of said speed controlling devices may be of the kind in which a rotor of the actuator forming part of the device has a fixed angular position relative to the stator of the actuator corresponding to zero phase displacement of the supplies energising said two polyphase windings of the actuator, in which case said actuator may serve as the means for closing said first pair of contacts of the closing circuit of the tie-breaker switch of the alternator associated with the speed controlling device, the rotor of the actuator being arranged to close the contacts when it is in a range of positions, including said fixed angular position relative to the stator of the actuator, corresponding to phase agreement of the supplies energising said two polyphase windings within the pull in range of the alternator associated with the speed controlling device.

According to another feature of the invention, in a system having the features of at least the first two of the last three preceding paragraphs, said manually operable selector switches may be operable in common, the selector switch of said selective manually operable switch system to connect said manually operable switch into the closing circuit of the tie-breaker switch of the alternator of which the polyphase windings of the speed-controlling device are connected respectively to the bus bars and the alternator by the other manually operable selector switch.

According to a still further feature of the present invention the system may include load adjusting means acting upon a power input-controlling device of one of the alternators to adjust the load of the said alternator into a desired relation with the load of another alternator, and switch means associated with the tie-breaker switches of the said two alternators effective to prevent operation of said load adjusting means when either of said tie-breaker switches are open.

According to a still further feature of the present invention, in the case where the system has more than two alternators, the system may include load adjusting means acting upon power input-controlling devices associated one with each of the alternators to adjust the load on each of the alternators in to a desired relationship with the total load on all the alternators, and switch means associated with the tie-breaker switches of all the alternators to prevent the operation of each of said load adjusting means when the tie-breaker switch of its alternator is open.

Said control means preferably also includes, for each tie-breaker switch, an opening circuit including a manually operable control switch individual to the tie-breaker switch. In this case, where the system also includes load-adjusting means for apportioning the load on one or more alternators, the opening circuit of the tie-breaker switch pertaining to each alternator controllable by a load-adjusting means is preferably separately actuable to open the tie-breaker switch by a pair of contacts operable by means responsive to load on said alternator when said load exceeds a predetermined value.

Two embodiments of the present invention will now be described with reference to the accompanying drawings in which:

Figure 1 shows a polyphase alternating current system according to the present invention, and Figure 2 shows the tie-breaker opening and closing circuits of a system as shown in Figure 1 but comprising three alternators instead of two alternators.

The system shown in Figure 1 comprises two three-phase alternators $A_1$ and $A_2$ driven respectively by air turbines $T_1$ and $T_2$, the speed of the turbines being controllable by variable-datum governors $G_1$ and $G_2$ through linkages $10_1$ and $10_2$ acting upon throttle valves $11_1$ and $11_2$ in the air inlet ducts of the turbines. The output lines $La$, $Lb$ and $Lc$ of the alternators are taken through main-breaker switches $MB_1$ and $MB_2$ to tie-breaker switches $TB_1$ and $TB_2$ through which they may be connected to tie bus bars $Ba$, $Bb$ and $Bc$. A load or series of loads $L_3$ may be supplied from the bus bars and each alternator also carries a load $L_1$ and $L_2$ respectively which is connected to its output lines so as to be supplied whether or not the corresponding tie-breaker switches $TB_1$ or $TB_2$ is closed.

The tie-breaker switches are power-operated by means of closing windings $12_1$ and $12_2$ respectively and opening trip windings $13_1$ and $13_2$ respectively. Since no special conditions have to be observed before opening either of the tie-breaker switches, the opening circuits which include the windings $13_1$ and $13_2$ need comprise only a manually operable switch, $14_1$ and $14_2$ respectively, and a source of operating current 15.

When neither of the tie-breaker switches is closed the bus bars are at earth potential and may be connected directly to either, but not both, of the alternators without synchronising being necessary. For this purpose each tie-breaker closing winding $12_1$, $12_2$ is provided with an operating circuit including the source 15, a manually operable switch 16 common to both circuits, a selector switch 17 which is manually operable to make contact at $17_1$, or $17_2$ to limit the effect of closing the switch 16 to one circuit at a time, and pairs of contacts $18_1$, $18_2$ respectively which are operated in common with the tie-breaker switch of the other circuit so as to be closed when the tie-breaker contacts are open, that is to say the pair of contacts $18_1$ is closed when the tie-breaker contacts $TB_2$ are open, and vice versa, this association being indicated by the dotted line connection 19. Similarly, the pair of contacts $18_2$ is closed when the tie-breaker contacts $TB_1$ are open, as indicated by the dotted line connection 20. It will be understood therefore, that when, for example, the tie-breaker contacts $TB_1$ are open, setting of the selector switch 17 to contact $17_2$ corresponding to alternator $A_2$ and closing the switch 16 results in the closing winding $12_2$ being energised through the contacts $18_2$ so that the tie-breaker switch $TB_2$ is immediately closed to connect the alternator $A_2$ to the bus bars. At the same time the contacts $18_1$ in the closing circuit of the winding $12_1$ of the tie-breaker switch $TB_1$ are opened, so that this switch cannot be operated through the contacts $18_1$. If on the other hand, the alternator $A_1$ is the first to be connected to the bus bars, the closing of the tie-breaker switch $TB_1$ is effected in an exactly similar manner by changing the selector switch 17 over to the contact $17_1$ and operating the switch 16, the contact $18_2$, then opening as the tie-breaker switch $TB_1$ closes.

To permit either alternator to be synchronised with the bus bars, so that both tie-breaker switches may be closed, the variable datum governor $G_1$ or $G_2$ respectively, controlling the turbine driving the alternator, is controlled by a synchronising actuator $S_1$ or $S_2$ respectively. These actuators are identical and are dynamo electric machines of the kind described in United States Patent No. 2,296,177 and most conveniently comprise a short-circuited rotor winding and two three phase stator windings acting differentially. In these machines the position of the rotor relatively to the stator is dependent upon the phase displacement of the supplies exciting the two stator windings, zero phase displacement corresponding to either of two fixed relative positions, for a 2-pole machine, and the rate of rotation of the rotor is dependent in magnitude and direction upon the difference between the frequencies of the exciting supplies. One of the stator windings of each actuator is connected by leads $21a$, $21b$, $21c$, to the output lines $La$, $Lb$ and $Lc$ of its associated alternator, and the other stator windings are connected by leads $22a$, $22b$, and $22c$ to the bus bars $Ba$, $Bb$ and $Bc$, all these connections being made through switch contacts of a selector switch operated in common with the selector switch 17 as indicated by the dotted line connection 23, so that when the selector switch is set for example, to make contact at $17_1$ for paralleling the alternator $A_1$ the stator windings of the actuator $S_1$ are connected as described, while the stator windings of the actuator $S_2$ are disconnected. When the stator windings of an actuator are thus connected, and the bus bars are already connected to the other alternator, the actuator will operate upon the governor G in response to the difference in frequency between the bus bars and its associated alternator in the sense to eliminate such difference by opening or closing the throttle valve of the turbine.

Upon the attainment of a sufficiently close degree of synchronisation for the alternators to be able to pull into step with one another, closing of the tie-breaker switch can take place at any instant when the two alternators are in sufficiently close phase agreement. As already mentioned, the position of the rotor of the actuator relatively to the stator is a measure of such phase agreement, and pairs of contacts $24_1$ and $24_2$ respectively are provided which are closed by the actuators $S_1$ and $S_2$ in such positions of phase agreement, the operative connections being indicated by the dotted lines 25 and 26. The pairs of contacts $24_1$ and $24_2$ are arranged in series with pairs of contacts $27_1$ and $27_2$ operated by time delay mechanism $28_1$ and $28_2$ in circuits for energising the closing windings of the tie-breaker switches $TB_1$ and $TB_2$, the time delay mechanisms operating in known manner to ensure sufficiently accurate frequency synchronisation before the closing of a tie-breaker switch is permitted to occur.

The control system operates in exactly the same manner whichever alternator is to be paralleled with the bus bars and it will be sufficient therefore to trace the operational sequences for the case in which the alternator $A_2$ is already connected to the bus bars by the tie-breaker switches $TB_2$ and it is desired to bring in the alternator $A_1$. To effect this the selector switch 17 is moved to the contact position $17_1$ the stator windings of the actuator $S_1$ being simultaneously connected respectively to the bus bars $Ba$, $Bb$ and $Bc$ and to the output lines $La$, $Lb$ and $Lc$ of the alternator $A_1$. At the same time, or after a brief interval, the switch button 16 is depressed and held in that position, but the tie-breaker closing winding $12_1$ is not energised through the contacts $18_1$ since these contacts are open. The actuator $S_1$ operates to control the speed of the turbine $T_1$ and the alternator $A_1$ to obtain synchronism with the bus bar frequency set by the alternator $A_2$. While this is proceeding the pair of contacts $24_1$ closes each time the alternator $A_1$ comes into phase agreement with the bus bars within the pull in range of the alternator, and the delay mechanism $28_1$ is set in operation. Until a sufficiently close degree of synchronisation is obtained however, the time that the contacts $24_1$ remain closed is insufficient to allow the time delay mechanism to close the contacts $27_1$. When such closing of the contacts $27_1$ simultaneously with the closing of the contacts $24_1$ does occur, the closing winding $12_1$ is energised and the tie-breaker switch $TB_1$ is closed, so that both alternators are now connected to the bus bars. To indicate that the switch button 16 may now be released indicator lamps $29_1$, $29_2$ are provided in parallel with the windings $12_1$ and $12_2$.

If it is desired to isolate one of the alternators, either to enable it to be shut down or to concentrate its output upon its own individual load, it is merely necessary to depress the corresponding switch button $14_1$ or $14_2$.

Once the alternators have been parallelled it is necessary to provide some means for proportioning the load between them by acting upon the throttle of one or other of the air turbines. In the system shown in Figure 1 a two-phase induction motor 30 is used for this purpose in a manner more fully described in United States Patent No. 2,710,355 and the specification accompanying British Patent Application No. 29,291/54. One phase winding 31 is energised by the voltage between the lines $La$ and $Lb$ of the alternators $A_2$ and the other phase winding 32 is energise by the difference between the currents induced in the secondary windings of current transformers $CT_1$ and $CT_2$ whose primaries are arranged in the output lines $Lc$ of the two alternators. In such a system the energisation of the motor winding 32 becomes zero at a particular ratio of the loads on the two alternators dependent upon the transformation ratios of the transformers $CT_1$ and $CT_2$, the load being equal if the transformation ratios are equal. The armature of the motor 30 and the synchronising actuator $S_2$ operate the governor $G_2$ through a differential transmission system represented by the lever 33. Once the alternators have been paralleled the synchronising actuators become inactive and control of the governor $G_2$ is taken over by the 2-phase motor 30, the arrangement being such as to maintain the desired ratio between the alternator loads. To prevent the alternator $A_2$ becoming overloaded, a pair of contacts 38 is provided which is closed by the motor 30 when it reaches the limit of its travel in the load-increasing direction, the said contacts completing the circuit of the opening winding $13_2$ of the tie-breaker switch $TB_2$ independently of the manually operable switch $14_2$. When either of the alternators is disconnected from the bus bars it is necessary to put the two-phase motor 30 out of operation, and this is done by providing two pairs of contacts 34 and 35 in circuit with the winding 32 of the motor and arranging for one pair to be opened when either one of the tie-breaker switches $TB_1$ or $TB_2$ is opened. In the arrangement shown the pair of contacts 34 are operable with the tie-breaker switch $TB_1$ as indicated by the chain dotted line connection 36 and the pair 35 is operated with the switch $TB_2$ as indicated by the connection 37.

The control system shown in Figure 1 can be extended to cover the requirements of any number of alternators, the closing and opening circuits for a three-alternator system being shown in Figure 2 by way of example. From this figure it will be seen that the number of contact positions of the selector switch 17 increases with the number of alternators, each position serving to connect the source 15 and the manually operable switch 16 to the closing circuits of one of the tie-breaker switches. These closing circuits are identical with those of Figure 1 except that in place of the single pair of contacts $18_1$, $18_2$ it is necessary to provide a pair for association with each other tie-breaker switch, that is to say two pairs 40 and 41 (suffix 1, 2 or 3) in each circuit for the three-alternator system.

In a multiple alternator system various arrangements of the load sharing system can be used, but they do not in themselves form part of the present invention and further description is considered unnecessary except to point out that means comparable with the pairs of contacts 34 and 35 should be provided to put out of action the load-sharing control of any alternator which has been detached from the bus bars. In some load sharing systems each alternator is provided with a load-share corrector motor such as 30 in Figure 1 and in such a case it will be desirable to provide load limiting contacts for each alternator as shown at $38_1$, $38_2$ and $38_3$ in Figure 2.

We claim:

1. In a polyphase alternating current system including at least two alternators driven by separate prime-movers, and bus-bars of a load network, said alternators being connectable to said bus-bars each by a separate power-actuated tie breaker switch, control means for the tie-breaker switches, which control means comprises for each tie-breaker switch, a closing circuit including a first pair of contacts operable by means sensitive to phase displacements between the load network bus bars and the alternator associated with the tie-breaker switch so as to close said contacts at times of phase agreement within the pull-in range, a second pair of contacts closable by a time-delay mechanism which is energised upon the closing of said first pair of contacts, said second pair of contacts being closed by said time delay mechanism after it has been energised for a predetermined time, and, for each other alternator, further pairs of contacts operable in common with the tie-breaker switch of each alternator so as to be closed when the tie-breaker switch is open and vice versa, said further pairs of contacts, when they are all closed, together short circuiting said first and second pairs of contacts, the control means also including a selective manually operable switch system permitting the closing circuits of all the tie-breaker switches to be energised from a power source one at a time and in any order.

2. Control means as claimed in claim 1, wherein said selective manually operable switch system comprises a manually operable switch which is common to all the tie-breaker switch closing circuits, and a manually operable selector switch having contacts for connecting said manually operable switch into the closing circuit of any one of the tie-breaker switches at a time.

3. Control means as claimed in claim 1, wherein each prime mover driving an alternator is provided with a speed controlling device of the kind responsive to the difference between the frequencies of energisation currents supplied to two polyphase windings of an actuator forming part of the device, and said control means includes a manually operable selector switch adjustable into a number of settings equal to the number of alternators, each setting serving to connect one of said polyphase windings of one of said speed-controlling devices to the bus bars of the load network and the other of said polyphase windings to the alternator associated with said one of said speed-controlling devices.

4. Control means as claimed in claim 3, wherein each of said speed controlling devices is of the kind in which a rotor of the actuator forming part of the device has a fixed angular position relative to the stator of the actuator corresponding to zero phase displacement of the supplies energising said two polyphase windings of the actuator, and the actuator serves as the means for closing said first pair of contacts of the closing circuit of the tie-breaker switch of the alternator associated with the speed controlling device, the rotor of the actuator being arranged to close the contacts when it is in a range of positions including said fixed angular position relative to the stator of the actuator, corresponding to phase agreement of the supplies energising said two polyphase windings within the pull-in range of the alternator associated with the speed controlling device.

5. Control means as claimed in claim 3, wherein said selective manually operable switch system comprises a manually operable switch which is common to all the tie-breaker switch closing circuits, and a manually operable selector switch having contacts for connecting said manually operable switch into the closing circuit of any one of the tie-breaker switches at a time and said manually operable selector switches are operable in common, the selector switch of said selective manually operable switch system being arranged to connect said manually operable switch into the closing circuit of the tie-breaker switch of the alternator of which the polyphase windings of the speed-controlling device are connected respectively to the bus bars and the alternator by the other manually operable selector switch.

6. In a polyphase alternating current system comprising at least two alternators driven each by a separate prime-mover, and bus-bars of a load network, the combination of, for each alternator, a power-operated tie-breaker switch for connecting the alternator to said bus-bars, control means for said tie-breaker switches, said control means comprising, for each tie-breaker switch, a closing circuit including a first pair of contacts operable by means sensitive to phase displacements between the load network bus-bars and the alternator associated with the tie-breaker switch so as to close said contacts at times of phase agreement within the pull-in range, a second pair of contacts closable by a time-delay mechanism which is energized upon the closing of said first pair of contacts, said second pair of contacts being closed by said time delay mechanism after it has been energized for a predetermined time, and, for each other alternator, a further pair of contacts operable in common with the tie-breaker switch of the alternator so as to be closed when the tie-breaker switch is open and vice versa, said further pairs of contacts, when they are all closed, together short circuiting said first and second pairs of contacts, the control means also including a selective manually operable switch system permitting the closing circuits of all the tie-breaker switches to be energized from a power source one at a time and in any order, and a power input controlling device for controlling the power input to one of the alternators, load adjusting means for adjusting said power input controlling device thereby to adjust the load of said one of the alternators into a desired relation with the load of a further one of the alternators, and switch means associated with the tie-breaker switches of said one and said further one of the alternators, effective to prevent operation of said load adjusting means when either of said tie-breaker switches is open.

7. In a polyphase alternating current system comprising more than two alternators driven each by a separate prime-mover, and bus-bars of a load network, the combination of, for each alternator, a power operated tie-breaker switch for connecting the alternator to said bus-bars, control means for said tie-breaker switches, said control means comprising, for each tie-breaker switch, a closing circuit including a first pair of contacts operable by means sensitive to phase displacements between the load network bus-bars and the alternator associated with the tie-breaker switch so as to close said contacts at times of phase agreement within the pull-in range, a second pair of contacts closable by a time-delay mechanism which is energised upon the closing of said first pair of contacts, said second pair of contacts being closed by said time delay mechanism after it has been energised for a predetermined time, and, for each other alternator, a further pair of contacts operable in common with the tie-breaker switch of the alternator so as to be closed when the tie-breaker switch is open and vice-versa, said further pairs of contacts, when they are all closed, together short circuiting said first and second pairs of contacts, the control means also including a selective manually operable switch system permitting the closing circuits of all the tie-breaker switches to be energised from a power source one at a time and in any order, and for each alternator, a power input controlling device for controlling the power input to the alternator and load adjusting means for adjusting the power input controlling device thereby to adjust the load of the alternator into a desired relationship with the total load on all the alternators, and switch means associated with the tie-breaker switches of all the alternators to prevent the operation of each of said load adjusting means when the tie-breaker switch of its alternator is open.

8. In a polyphase alternating current system including at least two alternators driven by separate prime-movers, and bus-bars of a load network, said alternators being connectable to said bus-bars each by a separate power-actuated tie-breaker switch, the combination of control means for the tie-breaker switches, which control means comprises for each tie-breaker switch, a closing circuit including a first pair of contacts operable by means sensitive to phase displacements between the load network bus-bars and the alternator associated with the tie-breaker switch so as to close said contacts at times of phase agreement within the pull-in range, a second pair of contacts closable by a time-delay mechanism which is energised upon the closing of said first pair of contacts, said second pair of contacts being closed by said time delay mechanism after it has been energised for a predetermined time, and, for each other alternator, a further pair of contacts operable in common with the tie-breaker switch of the alternator so as to be closed when the tie-breaker switch is open and vice versa, said further pairs of contacts, when they are all closed, together short circuiting said first and second pairs of contacts, the control means also including a selective manually operable switch system permitting the closing circuits of all the tie-breaker switches to be energised from a power source one at a time and in any order, and for each tie-breaker switch, an opening circuit including a manually operable control switch individual to the tie-breaker switch.

9. The combination as claimed in claim 7, with, for each tie-breaker switch, an opening circuit including a manually operable control switch individual to the tie-breaker switch, the opening circuit of the tie-breaker switch pertaining to each alternator controllable by a load-adjusting means being separately actuable to open the tie-breaker switch by a pair of contacts operable by means responsive to load on said alternator when said load exceeds a predetermined value.

References Cited in the file of this patent

UNITED STATES PATENTS

| | | |
|---|---|---|
| Re. 20,548 | Doyle | Nov. 9, 1937 |
| 2,296,177 | Newton | Sept. 15, 1942 |
| 2,383,306 | Hanna et al. | Aug. 21, 1945 |
| 2,501,340 | Kresser | Mar. 21, 1950 |
| 2,590,023 | Lewis et al. | Mar. 18, 1952 |
| 2,710,355 | Chilman et al. | June 7, 1955 |